(12) United States Patent
Berta

(10) Patent No.: US 6,218,032 B1
(45) Date of Patent: Apr. 17, 2001

(54) POLYOLEFIN COMPOSITIONS USED FOR MAKING EMBOSSED SHEETS WITH IMPROVED GRAIN RETENTION

(75) Inventor: Dominic A. Berta, Newark, DE (US)

(73) Assignee: Montell North America Inc., Wilmington, DE (US)

( * ) Notice: Subject to any disclaimer, the term of this patent is extended or adjusted under 35 U.S.C. 154(b) by 0 days.

(21) Appl. No.: 09/640,946

(22) Filed: Aug. 17, 2000

Related U.S. Application Data

(62) Division of application No. 09/235,421, filed on Jan. 22, 1999, now Pat. No. 6,162,872, which is a division of application No. 08/757,013, filed on Nov. 26, 1996, now abandoned.

(51) Int. Cl.⁷ .................................. B23P 9/00; C23F 3/00
(52) U.S. Cl. ............................................ 428/687; 525/240
(58) Field of Search .............................. 428/687; 525/240

(56) References Cited

U.S. PATENT DOCUMENTS

| 5,196,462 | 3/1993 | Berta ........................... 524/94 |
| 5,212,246 | 5/1993 | Ogale .......................... 525/240 |
| 5,338,801 | 8/1994 | Eppert ......................... 525/232 |

FOREIGN PATENT DOCUMENTS

| 0472956 | 3/1992 | (EP) . |
| 0634454 | 1/1995 | (EP) . |

*Primary Examiner*—Nathan M. Nutter

(57) ABSTRACT

Embossed sheets having improved grain retention can be made from a polyolefin composition containing a propylene polymer material, a partially crosslinked thermoplastic olefin elastomer composition, and optionally, crystalline polyethylene. Large parts such as automobile door and instrument panels can be formed from these sheets.

9 Claims, No Drawings

POLYOLEFIN COMPOSITIONS USED FOR MAKING EMBOSSED SHEETS WITH IMPROVED GRAIN RETENTION

This application is a division of Ser. No. 09/235,421, filed Jan. 22, 1999 and now U.S. Pat. No. 6,162,872 which is a division of Ser. No. 08/757,013 filed Nov. 26, 1996, now abandoned.

FIELD OF THE INVENTION

This invention relates to a polyolefin composition comprising (A) a propylene polymer material and (B) a partially crosslinked thermoplastic olefin elastomer composition.

BACKGROUND OF THE INVENTION

With advances in polyolefin technology, the use of polypropylene materials, particularly thermoplastic olefin materials (TPOs), in automotive applications has increased dramatically, replacing nonolefin materials such as acrylonitrile/butadiene/styrene terpolymer, polyvinyl chloride, and polycarbonate. Thermoplastic olefins are uncrosslinked blends of olefin polymers and polyolefin elastomers. New reactor product TPOs are finding use in areas such as interior trim (e.g., dashboards and door panels) due to their soft feel, thermoformability, and resistance to ultraviolet light and heat.

The process of producing these parts involves the following steps: (a) extrusion or calendering of the TPO sheet, (b) embossing (on- or off-line) of the extruded or calendered sheet to produce a textured or "grained" surface, (c) laminating and/or bonding extruded or calendered sheet to a foam or fabric for softness, (d) topcoating or painting the sheet for UV, scratch and mar resistance, and (e) forming the final part or other article from the sheet by thermoforming or low pressure injection molding.

U.S. Pat. No. 5,338,801 describes a polyolefin composition comprising (A) 70 to 90% of a propylene polymer material and (B) 30 to 10% of an olefin polymer material selected from the group consisting of (1) a partially crosslinked thermoplastic olefin elastomer composition consisting of a thermoplastic elastomer and an olefin rubber composition, (2) an uncrosslinked ethylene-propylene-conjugated diene terpolymer rubber, and (3) mixtures of (B)(1) and (B)(2). The composition provides low gloss after processing with retention of physical and mechanical properties.

A major drawback of TPOs has been their inability to retain embossed grain after the sheet is thermoformed into a large part such as a dashboard. The low melt strength and shear thinning that are typical of TPOs result in loss of the textured surface and walls that are too thin when the TPOs are formed into a part or other article.

SUMMARY OF THE INVENTION

In one embodiment, the polyolefin composition of this invention comprises, by weight,
(A) about 70% to about 40% of a propylene polymer material consisting essentially of:
  (1) about 10% to about 50% of a propylene homopolymer having an isotactic index of about 80% to about 99%, or a copolymer selected from the group consisting of (a) propylene and ethylene, (b) propylene, ethylene and a $CH_2$=CHR alpha-olefin, where R is a $C_{2-8}$ straight or branched alkyl group, and (c) propylene and an alpha-olefin as defined above in (1)(b), the copolymer containing about 85% to about 99% propylene and having an isotactic index of about 80% to about 98%,
  (2) about 3% to about 20% of a semi-crystalline, essentially linear copolymer fraction having a crystallinity of about 20% to about 60% by differential scanning calorimetry (DSC), wherein the copolymer is selected from the group consisting of (a) ethylene and propylene containing over 50% ethylene; (b) ethylene, propylene, and an alpha-olefin as defined above in (1)(b), containing from 1 to 10% of the alpha-olefin and over 50% up to 98% of both ethylene and alpha-olefin; and (c) ethylene and an alpha-olefin as defined in (1)(b) containing over 50% up to 98% of the alpha-olefin, which copolymer is insoluble in xylene at room or ambient temperature, and
  (3) about 40% to about 80% of a copolymer fraction selected from the group consisting of a copolymer of (a) ethylene and propylene, wherein the copolymer contains from 20% to less than 40% ethylene; (b) ethylene, propylene, and an alpha-olefin as defined in (1)(b), wherein the alpha-olefin is present in an amount of about 1% to 10%, and the amount of ethylene and alpha-olefin present is from 20% to less than 40%; and (c) ethylene and an alpha-olefin as defined in (1)(b), containing from 20 to less than 40% of the alpha-olefin, and optionally containing 0.5 to 10% of a diene, the copolymer fraction (3) being soluble in xylene at ambient temperature, and having an intrinsic viscosity of from 1.7 to 3.0 dl/g, wherein the total amount of fractions (2) and (3), based on the total olefin polymer composition is about 65% to about 80%, the weight ratio of fractions (2)/(3) is from 0.1 to about 0.3, and the total content of ethylene or $C_{4-8}$ alpha-olefin or combination thereof in fractions (2)+(3) is less than 50%, and
(B) about 30% to about 60% of a partially crosslinked thermoplastic olefin elastomer composition consisting essentially of:
  (1) about 50 to about 125 parts by weight of a thermoplastic elastomer consisting essentially of:
    (a) about 20% to about 70% of a propylene homopolymer having an isotactic index greater than 90, or a crystalline propylene copolymer with ethylene and/or a $C_{4-8}$ alpha-olefin having a propylene content greater than 85% and an isotactic index of greater than 85%;
    (b) about 30% to about 75% of an amorphous ethylene-propylene or ethylene-butene copolymer fraction, optionally containing from about 1% to about 10% of a diene, which is xylene soluble at room temperature and contains from about 30% to about 70% ethylene;
    (c) about 3% to about 30% of a semi-crystalline ethylene-propylene or ethylene-butene copolymer that is xylene insoluble at room temperature and contains greater than 75% ethylene; and, optionally,
    (d) about 2 to about 20 parts by weight of polybutene-1 based on 100 parts of (a)+(b)+(c), wherein the ratio of polybutene-1 to the amorphous fraction (b) is less than 0.5; and
  (2) about 5 parts to about 150 parts by weight of an olefin rubber material selected from the group consisting of:
    (a) an ethylene/propylene copolymer rubber having an ethylene content of about 30% to about 70%, and
    (b) a mixture of (i) a homopolymer of propylene having an isotactic index greater than 90, and (ii) an ethylene-propylene copolymer rubber containing about 30% to about 70% ethylene.

In another embodiment, the olefin polymer composition of this invention comprises:
(A) about 80% to about 40% of a propylene polymer material consisting essentially of:
  (1) about 10% to about 50% of a propylene homopolymer having an isotactic index of about 80% to about 99%, or a copolymer selected from the group consisting of (a) propylene and ethylene, (b) propylene, ethylene and a $CH_2$=CHR alpha-olefin, where R is a $C_{2-8}$ straight or branched alkyl group, and (c) propylene and an alpha-olefin as defined above in (1)(b), the copolymer containing about 85% to about 99% propylene and having an isotactic index of about 80% to about 98%,
  (2) about 3% to about 20% of a semi-crystalline, essentially linear copolymer fraction having a crystallinity of about 20% to about 60% by differential scanning calorimetry (DSC), wherein the copolymer is selected from the group consisting of (a) ethylene and propylene containing over 50% ethylene; (b) ethylene, propylene, and an alpha-olefin as defined above in (1)(b), containing from 1 to 10% of the alpha-olefin and over 50% up to 98% of both ethylene and alpha-olefin; and (c) ethylene and an alpha-olefin as defined in (1)(b) containing over 50% up to 98% of the alpha-olefin, which copolymer is insoluble in xylene at room or ambient temperature, and
  (3) about 40% to about 80% of a copolymer fraction selected from the group consisting of a copolymer of (a) ethylene and propylene, wherein the copolymer contains from 20% to less than 40% ethylene; (b) ethylene, propylene, and an alpha-olefin as defined in (1)(b), wherein the alpha-olefin is present in an amount of about 1% to about 10%, and the amount of ethylene and alpha-olefin present is from 20% to less than 40%; and (c) ethylene and an alpha-olefin as defined in (1)(b), containing from 20 to less than 40% of the alpha-olefin, and optionally containing 0.5 to 10% of a diene, the copolymer fraction (3) being soluble in xylene at ambient temperature, and having an intrinsic viscosity of from 1.7 to 3.0 dl/g, wherein the total amount of fractions (2) and (3), based on the total olefin polymer composition is about 65% to about 80%, the weight ratio of fractions (2)/(3) is from 0.1 to about 0.3, and the total content of ethylene or $C_{4-8}$ alpha-olefin or combination thereof in fractions (2)+(3) is less than 50%,
(B) about 20% to about 60% of a partially crosslinked thermoplastic olefin elastomer composition consisting essentially of:
  (1) about 50 parts to about 125 parts by weight of a thermoplastic elastomer consisting essentially of:
    (a) about 20% to about 70% of a propylene homopolymer having an isotactic index greater than 90, or a crystalline propylene copolymer with ethylene and/or a $C_{4-8}$ alpha-olefin having a propylene content greater than 85% and an isotactic index of greater than 85%;
    (b) about 30% to about 75% of an amorphous ethylene-propylene or ethylene-butene copolymer fraction, optionally containing about 1% to about 10% of a diene, which is xylene soluble at room temperature and contains about 30% to about 70% ethylene;
    (c) about 3% to about 30% of a semi-crystalline ethylene-propylene or ethylene-butene copolymer that is xylene insoluble at room temperature and contains greater than 75% ethylene; and, optionally,
    (d) about 2 to about 20 parts by weight of polybutene-1 based on 100 parts of (a)+(b)+(c), wherein the ratio of polybutene-1 to the amorphous fraction (b) is less than 0.5; and
  (2) about 5 parts to about 150 parts by weight of an olefin rubber material selected from the group consisting of:
    (a) an ethylene/propylene copolymer rubber having an ethylene content of about 30% to about 70%, and
    (b) a mixture of (i) a homopolymer of propylene having an isotactic index greater than 90, and (ii) an ethylene-propylene copolymer rubber containing about 30% to about 70% ethylene, and
(C) about 10 parts to about 40 parts of a crystalline ethylene polymer per hundred parts of (A)+(B).

The addition of the partially crosslinked TPO elastomer composition to the propylene polymer material produces sheet materials exhibiting significant improvement in grain retention and reduction in shear thinning. Large parts such as automobile door and instrument panels can be formed from these sheets.

DETAILED DESCRIPTION OF THE INVENTION

All parts and percentages used in this specification are by weight unless otherwise specified. Ambient or room temperature is approximately 25° C.

Component (A) used in the composition of the present invention is a propylene polymer material consisting essentially of:
  (1) about 10% to about 50% of a propylene homopolymer, preferably about 10% to about 40%, and most preferably about 20% to about 35%, having an isotactic index of about 80% to about 99%, and preferably about 85% to about 99%, or a copolymer selected from the group consisting of (a) propylene and ethylene, (b) propylene, ethylene and a $CH_2$=CHR alpha-olefin, where R is a $C_{2-8}$ straight or branched alkyl group, and (c) propylene and an alpha-olefin as defined above in (1)(b), wherein the copolymer contains about 85% to about 99%, and preferably about 90% to about 99% propylene and has an isotactic index of about 80% to about 98%, preferably about 85% to about 98%,
  (2) about 3% to about 20% of a semi-crystalline, essentially linear copolymer fraction, preferably about 7% to about 15%, having a crystallinity of about 20% to about 60%, by differential scanning calorimetry (DSC), wherein the copolymer is selected from the group consisting of (a) ethylene and propylene containing over 50% ethylene; (b) ethylene, propylene, and an alpha-olefin as defined above in (1)(b), containing from 1 to 10% of the alpha-olefin and over 50% up to 98%, preferably about 80% to about 95%, of both ethylene and alpha-olefin; and (c) ethylene and an alpha-olefin as defined in (1)(b), containing over 50% up to 98%, preferably about 80% to about 95%, of the alpha-olefin, which copolymer is insoluble in xylene at room or ambient temperature, and (3) about 40% to about 80% of a copolymer fraction, preferably about 50% to about 70%, selected from the group consisting of a copolymer of (a) ethylene and propylene wherein the copolymer contains from 20% to less than 40%, preferably about 20% to about 38%, most preferably about 25% to about 38% ethylene, (b) ethylene, propylene, and an alpha-olefin as defined in (1)(b), wherein the alpha-olefin is present in an amount of about 1% to about 10%, preferably about 1% to about 5%, and the amount of ethylene and alpha-olefin present is from 20% to less than 40%, and (c) ethylene and an alpha-olefin as defined in (1)(b), containing from 20 to less than 40%, preferably about 20% to about 38%, and most preferably about 25% to about 38% of the alpha-olefin, and optionally containing 0.5 to 10%, preferably 1 to 5%, of a diene, the copolymer fraction (3) being soluble in xylene at ambient temperature, and having an intrinsic viscosity of from 1.7 to 3.0 dl/g, wherein the total amount of ethylene units or the alpha-olefin units in the olefin polymer composition or of ethylene and the alpha-olefin units when both are present in the olefin polymer composition is from 15 to 35%, the total amount of fractions (2) and (3), based on the total olefin polymer composition is preferably about 65% to about 80%, the weight ratio of fractions (2)/(3) is preferably from 0.1 to about 0.3 and the total content of ethylene or $C_{4-8}$ alpha-olefin or combination thereof in fractions (2)+(3) is less than 50%, and preferably from 20 to 45%.

The propylene polymer material of component (A) has at least one melt peak, determined by DSC, present at temperatures higher than 120° C., and at least one peak, relative to the vitreous transition, present at temperatures from −10° C., and −35° C. In addition, these materials have a flexural modulus of less than 150 MPa, generally from 20 and 100 MPa; a tensile strength at yield of from 10 to 20 MPa; elongation at break over 400%; a tension set, at 75% strain, from 20% to 50%; a Shore D hardness from 20 to 35; a haze value of less than 40%, preferably less than 35%, and do not break (no brittle impact failure) when an Izod impact test is conducted at −50° C. Component (A) is present in an amount of about 70% to about 40%, preferably about 70% to about 60% of the total composition Component (A) can be prepared by a polymerization process comprising at least two stages, where in the first stage the propylene, or propylene and ethylene or the alpha-olefin, or propylene, ethylene and alpha-olefin are polymerized to form component (A)(1), and in the following stages the mixtures of ethylene and propylene or alpha-olefin, or propylene, ethylene and alpha-olefin, and optionally a diene, are polymerized to form components (2) and (3).

The polymerization can be conducted in the liquid phase, gas phase, or liquid-gas phase using separate reactors, all of which can be done either by batch or continuously. For example, it is possible to carry out the polymerization of component (A)(1) using liquid propylene as a diluent, and the polymerization of components (2) and (3) in the gas phase, without intermediate stages except for the partial degassing of the propylene. The preparation of the propylene polymer material is described in more detail in U.S. Pat. No. 5,212,246, the process of which is incorporated herein by reference.

Component (B) of the present invention is a partially crosslinked thermoplastic olefin elastomer composition consisting essentially of:
(1) about 50 to about 125 parts by weight of a thermoplastic elastomer composition consisting essentially of:
  (a) about 20% to about 70%, preferably about 20% to about 50%, of a propylene homopolymer having an isotactic index greater than 90%, preferably greater than 98%, or a crystalline propylene copolymer with ethylene and/or a $C_{4-8}$ alpha-olefin having a propylene content greater than 85% and an isotactic index of greater than 85%,
  (b) about 30% to about 75%, preferably from about 30% to about 50%, of an amorphous ethylene-propylene or ethylene-butene copolymer fraction, optionally containing about 1% to about 10%, preferably about 1% to about 5%, of a diene, which is xylene soluble at room temperature and contains about 30% to about 70% ethylene;
  (c) about 3% to about 30%, preferably about 5% to about 20%, of a semi-crystalline ethylene-propylene or ethylene-butene copolymer that is xylene insoluble at room temperature and contains greater than 75% ethylene, preferably greater than 85%; and, optionally,
  (d) about 2 to about 20 parts by weight of polybutene-1 based on 100 parts of (a)+(b)+(c), wherein the ratio of polybutene-1 to the amorphous fraction (b) is less than 0.5, and
(2) about 5 parts to about 150 parts by weight of an olefin rubber material selected from the group consisting of:
  (a) an ethylene/propylene copolymer rubber having an ethylene content of about 30% to about 70%, and
  (b) a mixture of (i) a homopolymer of propylene having an isotactic index greater than 90, preferably greater than 98%, and (ii) an ethylene-propylene copolymer rubber containing about 30% to about 70% ethylene.

In the compositions of the present invention component (B) is present in an amount of about 30% to about 60%, preferably about 30% to about 40%.

The $C_4$–$C_{10}$ alpha-olefins useful in the preparation of components (A) and (B) of the polyolefin composition of this invention include butene-1; pentene1; hexene1;4-methylpentene-1, and octene-1.

The diene, when present, is typically a butadiene; 1,4-hexadiene; 1,5-hexadiene, or ethylidenenorbornene.

The polybutene-1 is a crystalline isotactic polybutene having a density of 0.914 to 0.919 g/cm$^3$, with a melt index of 1 to 100 g/10 min. When used, the polybutene-1 is present in an amount of 2 to 20 parts, preferably 4 to 15 parts, based on 100 parts of (1)(a+b+c). The ratio of the polybutene-1 to component (1)(b) is preferably less than 0.5, most preferably 0.1 to 0.3.

When component (B)(2) is a mixture of a propylene homopolymer and an ethylene/propylene copolymer rubber, the amount of propylene homopolymer is about 10% to about 20%, based on the total weight of the mixture.

Component (B) is prepared by adding a peroxide curing system comprising an organic peroxide and at least one crosslinking aid selected from poly(1,2-butadiene) and furan derivatives, to a mixture of components (a), (b), (c) and, optionally, (d), and subjecting the mixture to curing conditions while masticating the mixture to bring about the desired dynamic partial cure.

Preferably components (B)(1)(a), (b) and (c) are formed in a reactor or series of reactors in at least two stages by first polymerizing propylene to form component (a) and then polymerizing ethylene and propylene or ethylene and butene in the presence of component (a) and the catalyst used in the first stage to form components (b) and (c). The polymerization can be conducted in the liquid or gas phase or in liquid-gas phase. In the alternative, components (a), (b), and (c) can each be prepared separately and then mixed by melt-kneading or melt blending.

When present, component (B)(1(d), the polybutene-1, is typically added to the reactor blend of (B)(1)(a+b+c) as a masterbatch that also contains component (B)(2 (b). The amount of propylene homopolymer plus polybutene-1 is about 10% to about 20% by weight, based on the total weight of the masterbatch.

The term "partially cured" means that the degree of curing, in terms of the gel content, is at least 80% and no more than 94% in cyclohexane. Preferably, the gel content is from 85 to 92%. Percent gel content is determined by soaking a weighed 1.5"×0.75"×0.080" test specimen in about 100 ml cyclohexane at about 23° C. for 48 hours, removing the sample and drying to constant weight (about 72 hours) in a vacuum oven at 80° C. The % gel is calculated as:

$$\% \text{ gel} = \frac{\text{Initial wt. of rubber} - \text{Wt. of rubber extracted}}{\text{Initial wt. of rubber in sample}} \times 100\%$$

The preparation of the partially cured thermoplastic elastomer is described in more detail in U.S. Pat. No. 5,196,462, the process of which is incorporated herein by reference.

In another embodiment, the composition of this invention can also contain component (C), a crystalline ethylene polymer. Any type of crystalline ethylene polymer can be used, e.g., high density polyethylene, which can be either a homopolymer or a copolymer with a small amount of another α-olefin; medium density polyethylene; low density polyethylene, or linear low density polyethylene (LLDPE), which is a copolymer with another α-olefin, typically a 4–8 C α-olefin, the copolymer typically having a density of 0.88 to 0.945 g/cm$^3$, a melt index of 0.1 to 10 g/10 min and a content of 4–8 C α-olefin of up to 20%. The ethylene polymer can be prepared using either Zeigler-Natta or metallocene catalysts.

When component (C) is present, the olefin polymer composition comprises:
(A) about 80% to about 40% of a propylene polymer material consisting essentially of:
  (1) about 10% to about 50% of a propylene homopolymer having an isotactic index of about 80% to about 99%, or a copolymer selected from the group consisting of (a) propylene and ethylene, (b) propylene, ethylene and a CH$_2$=CHR alpha-olefin, where R is a C$_{2-8}$ straight or branched alkyl group, and (c) propylene and an alpha-olefin as defined above in (1)(b), the copolymer containing about 85% to about 99% propylene and having an isotactic index of about 80% to about 98%,
  (2) about 3% to about 20% of a semi-crystalline, essentially linear copolymer fraction having a crystallinity of about 20% to about 60% by differential scanning calorimetry (DSC), wherein the copolymer is selected from the group consisting of (a) ethylene and propylene containing over 50% ethylene; (b) ethylene, propylene, and an alpha-olefin as defined above in (1)(b), containing from 1 to 10% of the alpha-olefin and over 50% up to 98% of both ethylene and alpha-olefin; and (c) ethylene and an alpha-olefin as defined in (1)(b) containing over 50% up to 98% of the alpha-olefin, which copolymer is insoluble in xylene at room or ambient temperature, and
  (3) about 40% to about 80% of a copolymer fraction selected from the group consisting of a copolymer of (a) ethylene and propylene, wherein the copolymer contains from 20% to less than 40% ethylene; (b) ethylene, propylene, and an alpha-olefin as defined in (1)(b), wherein the alpha-olefin is present in an amount of about 1% to about 10%, and the amount of ethylene and alpha-olefin present is from 20% to less than 40%; and (c) ethylene and an alpha-olefin as defined in (1)(b), containing from 20 to less than 40% of the alpha-olefin, and optionally containing 0.5 to 10% of a diene, the copolymer fraction (3) being soluble in xylene at ambient temperature, and having an intrinsic viscosity of from 1.7 to 3.0 dl/g, wherein the total amount of fractions (2) and (3), based on the total olefin polymer composition is about 65% to about 80%, the weight ratio of fractions (2)/(3) is from 0.1 to about 0.3, and the total content of ethylene or C$_{4-8}$ alpha-olefin or combination thereof in fractions (2)+(3) is less than 50%, and
(B) about 20% to about 60% of a partially crosslinked thermoplastic olefin elastomer composition consisting essentially of:
  (1) about 50 to about 125 parts by weight of a thermoplastic elastomer consisting essentially of:
    (a) about 20% to about 70% of a propylene homopolymer having an isotactic index greater than 90, or a crystalline propylene copolymer with ethylene and/or a C$_{4-8}$ alpha-olefin having a propylene content greater than 85% and an isotactic index of greater than 85%;
    (b) about 30% to about 75% of an amorphous ethylene-propylene or ethylene-butene copolymer fraction, optionally containing about 1% to about 10% of a diene, which is xylene soluble at room temperature and contains about 30% to about 70% ethylene;
    (c) about 3% to about 30% of a semi-crystalline ethylene-propylene or ethylene-butene copolymer that is xylene insoluble at room temperature and contains greater than 75% ethylene; and, optionally,
    (d) about 2 to about 20 parts by weight of polybutene-1 based on 100 parts of (a)+(b)+(c), wherein the ratio of polybutene-1 to the amorphous fraction (b) is less than 0.5; and
  (2) about 5 parts to about 150 parts by weight of an olefin rubber material selected from the group consisting of:
    (a) an ethylene/propylene copolymer rubber having an ethylene content of about 30% to about 70%, and
    (b) a mixture of (i) a homopolymer of propylene having an isotactic index greater than 90, and (ii) an ethylene-propylene copolymer rubber containing about 30% to about 70% ethylene, and
(C) about 10 parts to about 40 parts of a crystalline ethylene polymer per hundred parts of (A)+(B).

The compounding or melt blending of components (A), (B) and optionally (C) of the present invention can be carried out on an open roll, in an internal mixer (Banbury or Haake mixers), and single-screw or twin-screw extruders.

The polyolefin composition of the present invention can also contain other conventional additives, for example, antioxidants, stabilizers, extender oils such as paraffinic and naphthenic oils, fillers such as CaCO$_3$, talc and zinc oxide, or flame retardants.

Evaluating the amount of grain retention is highly subjective, since there are no standardized tests to measure this property per se. The aesthetic appearance of the final part is presently the industry standard in determining specimen acceptability.

In order to evaluate the relative grain retention of olefin polymer materials, the appearance of thermoformed sample specimens prepared from embossed sheets when viewed with the naked eye was compared with the compression set value of the present industry standards, i.e, polyvinyl chloride (PVC) and blends of PVC and acrylonitrile/butadiene/styrene (ABS). Both PVC and PVC/ABS blends had good grain retention. Compression set measures the percentage to which a polymer remains compressed after compression under standard conditions, i.e., 22 hours @ 212° F. according to ASTM-395, Method B. For example, 100% compression set translates to a sample that when compressed remains 100% compressed and does not recover to its original dimensions. Conversely, a sample with 0% compression set rebounds to 100% of its initial dimensions. The lower the compression set value, the better a material retains its original shape. PVC had a compression set value of 80 and the PVC/ABS blend a value of 78. From a measurement of the compression set value of various materials it was concluded that a compression set value equal to or less than 85% would result in a material with acceptable grain retention in automotive parts.

COMPARATIVE EXAMPLE 1

Examples 1–3

This experiment demonstrates the effect on compression set value and grain retention when various amounts of a propylene polymer material, a partially crosslinked thermoplastic elastomer composition, and optionally polyethylene were blended together. The results are given in Table 1.

Pellets or spheres of the materials used were tumble blended dry by hand in a plastic bag or Henschel milled at moderate speed for two minutes. The blended materials were extruded using a Prodex 1¾" extruder having a barrel temperature of 380°–400° F. to make a sheet ~40 mils thick and 6" wide. The sheet was collected into rolls using take-up rollers chilled to 50° F.

The sheet was cut into 9" long sections for testing the thermoformability and the grain retention. A grain was embossed on the sheet sections by placing a screen on top of the sheet section and warming to 280° F. and applying a pressure of 1 to 3 tons using a compression molding press.

The embossed sheet was placed in the frame of a thermoformer and heated from 280°–340° F. and air was blown at the warm sheet from a hose to create a bubble. Formability was judged by determining the variation in the thickness of the bubble and in the height of the bubble; the more uniform the thickness and the lower the bubble height, the better the formability. Grain retention was judged by visual observation of the degree of washout or disappearance of the grain after thermoforming.

Component (A) was a propylene polymer material comprising (a) 30% of a propylene-ethylene random copolymer having an ethylene content of 3.3%, (b) 6.8% of a semi-crystalline ethylene-propylene copolymer fraction that is insoluble in xylene at room temperature, and (c) 63.2% of an amorphous ethylene-propylene copolymer fraction that is soluble in xylene at room temperature.

Component (B) was a composition comprising:

(1) 61.2% of a thermoplastic elastomer consisting of (i) 45% of a propylene homopolymer having an isotactic index, defined as the xylene insoluble fraction, of 97.5%, (ii) 10% of a semi-crystalline ethylene-propylene copolymer that is xylene insoluble at room temperature, and (iii) 45% of an amorphous ethylene-propylene copolymer rubber that is xylene soluble at room temperature, (2) 0.41% of PB-0400 polybutene, commercially available from Shell, (3) 7.79% of a mixture of 16.4% propylene homopolymer having an isotactic index of 99% and a melt flow rate (MFR) of ~2 dg/min (ASTM D-1238, 2.16 kg at 230° C.), commercially available from Montell North America Inc., and 74.6% Dutral CS-18/89 ethylene/propylene copolymer rubber having an ethylene content of 57% and a Mooney viscosity of 122 ML (1+4) at 121° C., commercially available from Enichem America Inc., and 9% polybutene, commercially available from Shell, (4) 1.94% ZnO, (5) 0.16% tetrakis(methylene(3,5-di-tert-butyl-4-hydroxyhydrocinnamate) methane, (6) 0.16% 4,4'-thio-bis-(6-tert-butyl-m-cresol), (7) 19.47% paraffin oil, (8) 2.08% 1,1'-(t-butylperoxy) diisopropylbenzene, commercially available from R. T. Vanderbilt, (9) 2.22% carbon black, Colonial 3300—50/50 concentrate of carbon black and linear low density polyethylene, commercially available from Colonial Rubber Co.,

(10) 1.39% zinc salt of mercaptobenzothiazole, commercially available from R. T. Vanderbilt,

(11) 0.27% Vultac 7 poly(alkylphenol disulfide), commercially available from Pennwalt,

(12) 2.22% polybutadiene, commercially available from Colorado Chemical,

(13) 0.55% Smellrite sodium potassium aluminum silicate, commercially available from UOP, and

(14) 0.05% vanilla, commercially available from Givaudan Corporation.

TABLE 1

| Example | Component (A) (parts by wt.) | Component (B) (parts by wt.) | LLDPE (pph) | Compression Set Value | Grain Retention | Formability |
|---|---|---|---|---|---|---|
| Comp. Ex. 1 | 100 | 0 | 0 | 92 | Poor | Poor |
| Ex. 1 | 70 | 30 | 0 | 83 | Good–Fair | Good–Fair |
| Ex. 2 | 50 | 50 | 0 | 73 | Good | Good |
| Ex. 3 | 70 | 30 | 10 | 82 | Good–Very Good | Good–Very Good |

Example 4

The following components in the amounts shown in Table 2 were blended as described in Examples 1–3. The amounts of additives are given in parts per hundred parts of (A)+(B)+(C) (pph).

Component (A) was a propylene polymer material comprising (1) 35% of a propylene homopolymer having an isotactic index, defined as the xylene insoluble fraction, of 97.5, (2) 6.9% of a semi-crystalline ethylene-propylene copolymer fraction that is xylene insoluble at room temperature, and (3) 58.1 % of an amorphous ethylene-propylene copolymer rubber that is xylene soluble at room temperature, Component (B) was a composition comprising:
(1) 61.2% of a thermoplastic elastomer consisting of (i) 45% of a propylene homopolymer having an isotactic index, defined as the xylene insoluble fraction, of 97.5%, (ii) 10% of a semi-crystalline ethylene-propylene copolymer that is xylene insoluble at room temperature, and (iii) 45% of an amorphous ethylene-propylene copolymer rubber that is xylene soluble at room temperature,
(2) 0.41% of PB-0400 polybutene, commercially available from Shell,
(3) 7.79% of a mixture of 16.4% propylene homopolymer having an isotactic index of 99% and a MFR of ~2 dg/min, commercially available from Montell North America, Inc., and 74.6% of Dutral CS-18/89 ethylene/propylene copolymer rubber having an ethylene content of 57% and a Mooney viscosity of 122 ML (1+4) at 121° C., commercially available from Enichem America Inc., and 9% polybutene, commercially available from Shell,
(4) 1.94% ZnO,
(5) 0.16% tetrakis(methylene(3,5-di-tert-butyl-4-hydroxyhydrocinnamate)methane,
(6) 0.16% 4,4'-thio-bis-(6-tert-butyl-m-cresol),
(7) 19.47% paraffin oil,
(8) 2.08% 1,1'-(t-butylperoxy)diisopropylbenzene, commercially available from R. T. Vanderbilt,
(9) 2.22% carbon black, Colonial 3300—a 50/50 concentrate of carbon black and linear low density polyethylene, commercially available from Colonial Rubber Co.,
(10) 1.39% zinc salt of mercaptobenzothiazole,
(11) 0.27% Vultac 7 poly(alkylphenol disulfide), commercially available from Pennwalt,
(12) 2.22% polybutadiene,
(13) 0.55% Smellrite sodium potassium aluminum silicate, commercially available from UOP, and
(14) 0.05% vanilla.

Component (C) was a copolymer of ethylene and ~11% butene-1, having a density of 0.916 g/ml and a melt flow rate of 0.95 g/10 min (ASTM D-1238, 190° C., 2.16 kg).

Stabilizer 1 was bis(2,2,6,6-tetramethyl4-piperidinyl) sebacate.

Stabilizer 2 was 2-(2-hydroxy-3,5-di-tert-amylphenyl)-2H-benzotriazole.

Stabilizer 3 was B-225 antioxidant, a blend of 1 part Irganox 1010 [methylene-3-(3,5-di-t-butyl-4-hydroxyphenyl)propionate]methane and 1 part Irgafos 168 tris(2,4-di-t-butylphenyl)phosphite, commercially available from Ciba-Geigy.

The polymer blend was formed into a sheet and the sheet was embossed as desribed in Example 1–3. The compression set was measured and grain retention was evaluated as described previously. The compression set was 83, and grain retention and formability were rated as good to very good.

TABLE 2

| | |
|---|---|
| Component A (parts) | 80 |
| Component B (parts) | 20 |
| Component C (pph) | 33 |
| Stabilizer 1 (pph) | 0.66 |
| Stabilizer 2 (pph) | 0.66 |
| Stabilizer 3 (pph) | 0.26 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:
1. An embossed sheet comprising a polyolefin composition comprising, by weight,
(A) about 80% to about 40% of a propylene polymer material consisting essentially of:
(1) about 10% to about 50% of a propylene homopolymer having an isotactic index of about 80% to about 99%, or a copolymer selected from the group consisting of (a) propylene and ethylene, (b) propylene, ethylene and a $CH_2$=CHR alpha-olefin, where R is a $C_{2-8}$ straight or branched alkyl group, and (c) propylene and an alpha-olefin as defined above in (1)(b), the copolymer containing about 85% to about 99% propylene and having an isotactic index of about 80% to about 98%,
(2) about 3% to about 20% of a semi-crystalline, essentially linear copolymer fraction having a crystallinity of about 20% to about 60% by differential scanning calorimetry (DSC), wherein the copolymer is selected from the group consisting of (a) ethylene and propylene containing over 50% ethylene; (b) ethylene, propylene, and an alpha-olefin as defined above in (1)(b) containing from 1 to 10% of the alpha-olefin and over 50% up to 98% of both ethylene and alpha-olefin; and (c) ethylene and an alpha-olefin as defined in (1)(b), containing over 50% up to 98% of the alpha-olefin, which copolymer is insoluble in xylene at room or ambient temperature, and
(3) about 40% to about 80% of a copolymer fraction selected from the group consisting of a copolymer of (a) ethylene and propylene, wherein the copolymer contains from 20% to less than 40% ethylene; (b) ethylene, propylene, and an alpha-olefin as defined in (1)(b), wherein the alpha-olefin is present in an amount of about 1% to about 10%, and the amount of ethylene and alpha-olefin present is from 20% to less than 40%; and (c) ethylene and an alpha-olefin as defined in (1)(b), containing from 20 to less than 40% of the alpha-olefin, and optionally containing 0.5 to 10% of a diene, the copolymer fraction (3) being soluble in xylene at ambient temperature, and having an intrinsic viscosity of from 1.7 to 3.0 dl/g, wherein the total amount of fractions (2) and (3), based on the total olefin polymer composition is about 65% to about 80%, the weight ratio of fractions (2)/(3) is from 0.1 to about 0.3, and the total content of ethylene or $C_{4-8}$ alpha-olefin or combination thereof in fractions (2)+(3) is less than 50%,
(B) about 20% to about 60% of a partially crosslinked thermoplastic olefin elastomer composition consisting essentially of:
(1) about 50 parts to about 125 parts by weight of a thermoplastic elastomer consisting essentially of:
(a) about 20% to about 70% of a propylene homopolymer having an isotactic index greater than 90, or a crystalline propylene copolymer with ethylene and/or a $C_{4-8}$ alpha-olefin having a propylene content greater than 85% and an isotactic index of greater than 85%;
(b) about 30% to about 75% of an amorphous ethylene-propylene or ethylene-butene copolymer fraction, optionally containing about 1% to about 10% of a diene, which is xylene soluble at room temperature and contains about 30% to about 70% ethylene;
  (c) about 3% to about 30% of a semi-crystalline ethylene-propylene or ethylene-butene copolymer that is xylene insoluble at room temperature and contains greater than 75% ethylene; and, optionally,
  (d) about 2 to about 20 parts by weight of polybutene-1 based on 100 parts of (a)+(b)+(c), wherein the ratio of polybutene-1 to the amorphous fraction (b) is less than 0.5; and
  (2) about 5 parts to about 150 parts by weight of an olefin rubber material selected from the group consisting of:
    (a) an ethylene/propylene copolymer rubber containing about 30% to about 70% ethylene, and
    (b) a mixture of (i) a homopolymer of propylene having an isotactic index greater than 90, and (ii) an ethylene-propylene copolymer rubber containing about 30% to about 70% ethylene, and
(C) about 10 parts to about 40 parts of a crystalline ethylene polymer per hundred parts of (A)+(B).

2. The embossed sheet of claim 1 wherein (C) is linear low density polyethylene containing up to 20% by weight of a $C_4$–$C_8$ α-olefin and having a density of 0.88 to 0.945 g/cm$^3$ and a melt flow rate of 0.1 to 10 g/10 min.

3. The embossed sheet of claim 1 wherein component (A)(1) is a propylene/ethylene copolymer.

4. The embossed sheet of claim 1 wherein component (A)(1) is a propylene homopolymer.

5. The embossed sheet of claim 1 wherein component (A)(2) is an ethylene/propylene copolymer and component (A)(3) is an ethylene/propylene copolymer.

6. The embossed sheet of claim 1 wherein component (B)(1)(a) is a propylene homopolymer, component (B)(1)(b) is an ethylene/propylene copolymer, and component (B)(1)(c) is an ethylene/propylene copolymer.

7. The embossed sheet of claim 1 wherein optional component (B)(1)(d) has a density of 0.914–0.919 g/cm$^3$ and a melt index of 1–100 g/10 min.

8. The embossed sheet of claim 1 wherein component (B)(2) is a mixture of a propylene homopolymer and an ethylene/propylene copolymer rubber.

9. The embossed sheet of claim 1 wherein component (C) is an ethylene/butene-1 copolymer.

* * * * *